April 25, 1961
W. S. KING
2,981,495
ACTUATING MECHANISM FOR FISHING REELS
Filed June 23, 1958
3 Sheets-Sheet 1
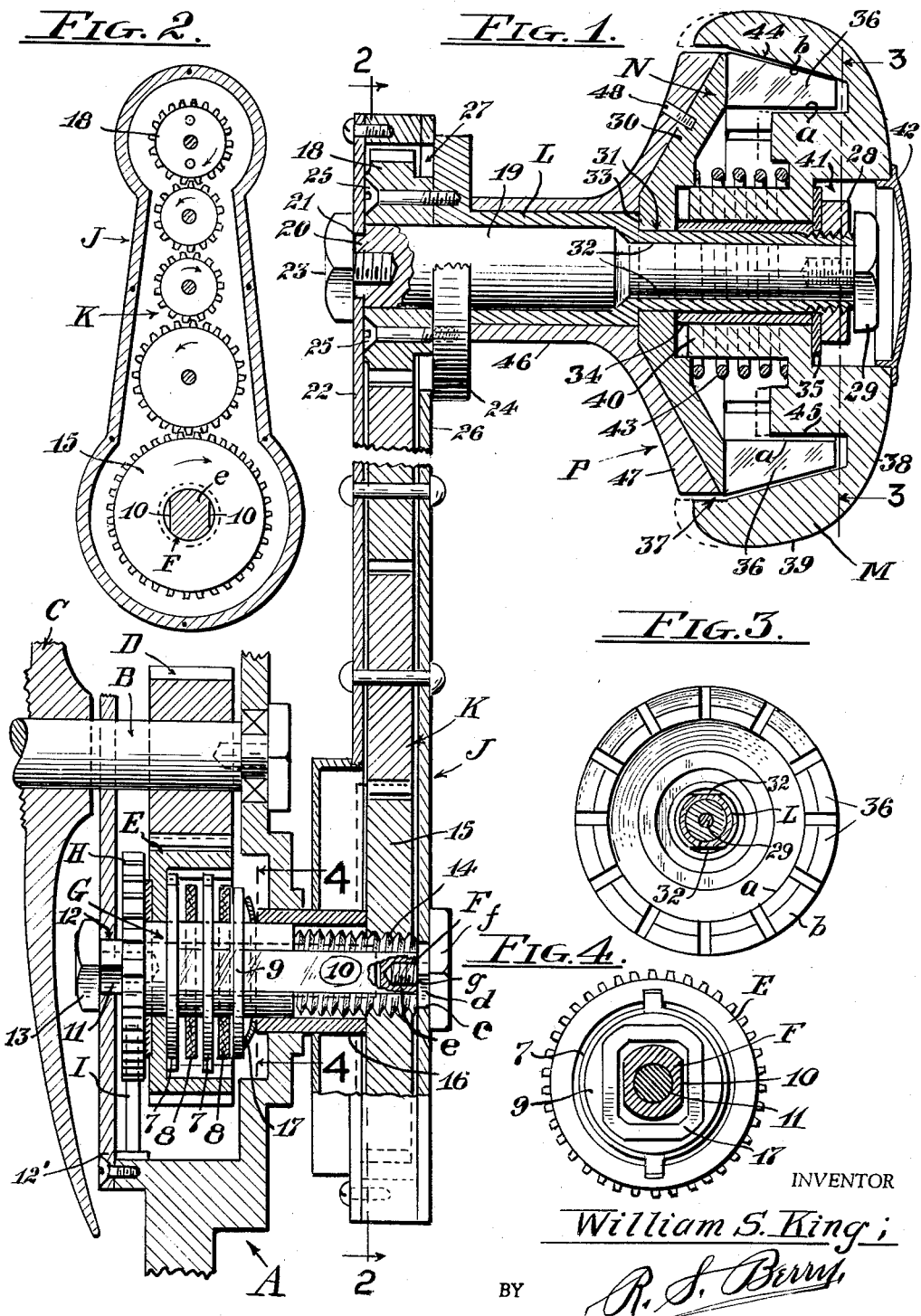
INVENTOR
William S. King;
BY R. S. Berry,
ATTORNEY

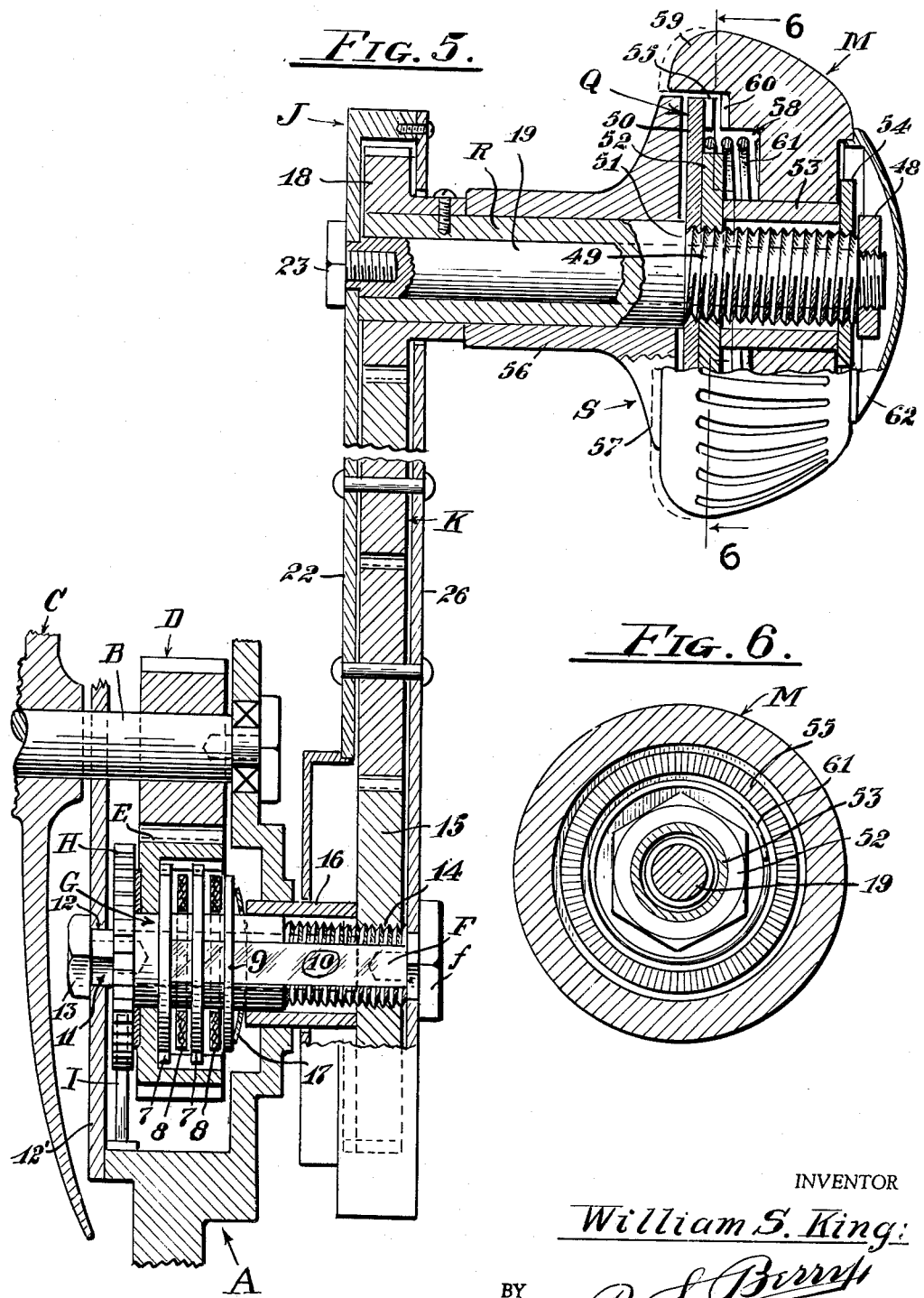

April 25, 1961  W. S. KING  2,981,495
ACTUATING MECHANISM FOR FISHING REELS
Filed June 23, 1958  3 Sheets-Sheet 3
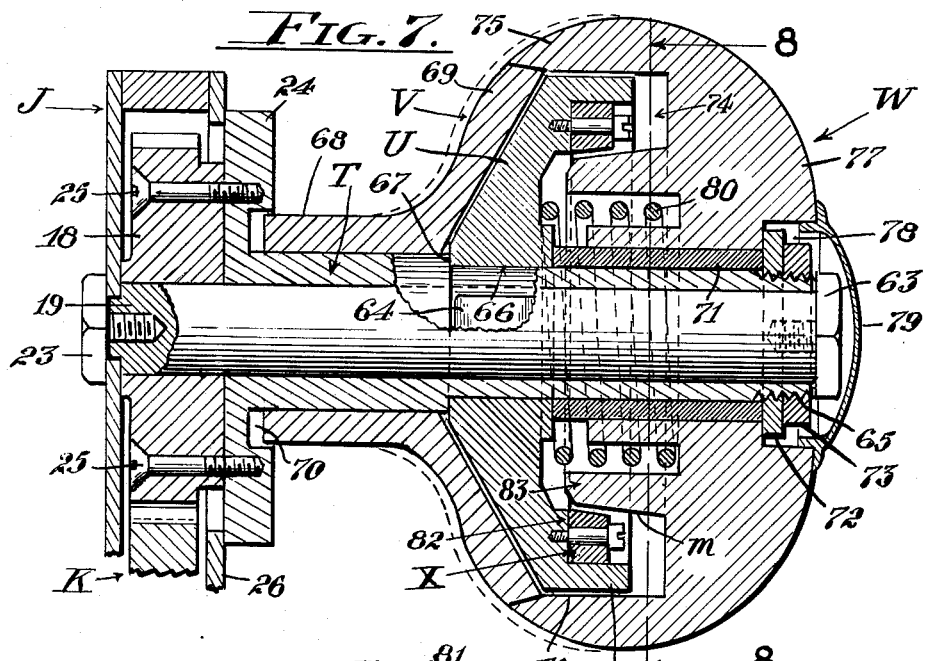
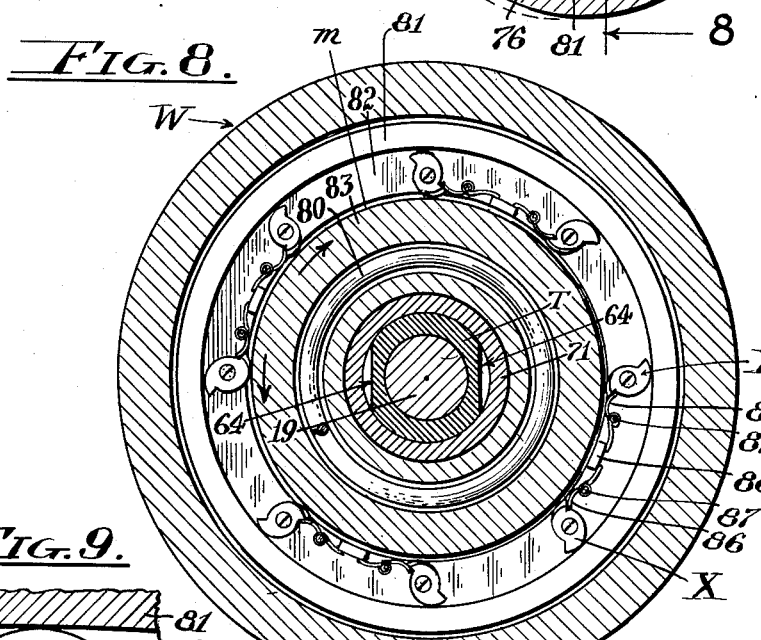
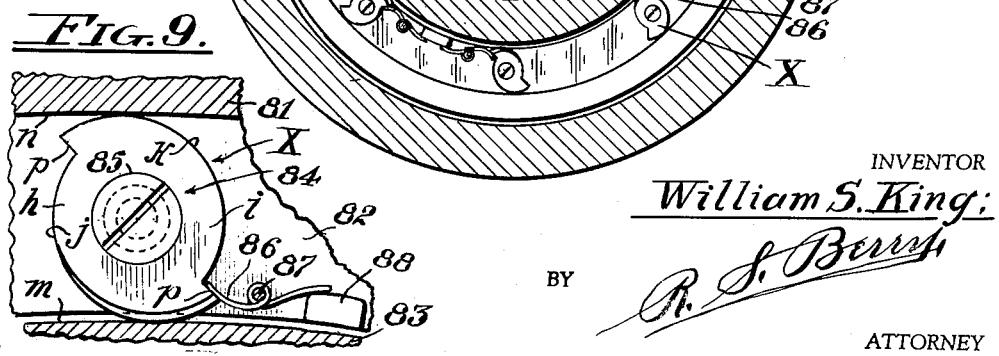
INVENTOR
William S. King;
BY R. S. Berry
ATTORNEY United States Patent Office 2,981,495
Patented Apr. 25, 1961

2,981,495

ACTUATING MECHANISM FOR FISHING REELS

William S. King, 10096 Tujunga Canyon Blvd., Tujunga, Calif.

Filed June 23, 1958, Ser. No. 743,531

14 Claims. (Cl. 242—84.54)

This invention relates to a fishing reel actuating and control mechanism of the type embodying a drag mechanism adapted to be operated to restrain or retard rotation of a spool under a pull imposed on a line wound on said spool, or to permit free rotation of the spool under a pull on the line, and also embodying a hand crank connected to said drag mechanism for effecting rotation of the spool through said mechanism to wind the line thereon, and wherein the crank is provided with means for adjusting the drag mechanism irrespective of rotation or position of the crank. The drag mechanism is commonly controlled by means of a turnable gripping handle or knob carried on the spool winding crank for driving a gear train leading to the drag mechanism.

The primary object of the present invention is to provide an improved construction in the gripping handle or knob whereby it is adapted to be instantly manipulated by the hand of the operator while gripping the handle to control the drag mechanism irrespective of rotation or position of the crank, and wherein actuation of the drag mechanism to restrain or retard rotation of the line carrying spool is effected by the manual application of inward pressure on the gripping handle or knob longitudinally of its axis followed by turning of the handle or knob in one direction relative to the crank and wherein action of the drag mechanism is terminated by turning the handle or knob in the opposite direction relative to the crank while subjected to inward pressure.

Another object is to provide the gripping handle with a clutch element which is normally disengaged to allow free rotation of the handle around its axis as when turning the spool operating crank, but which clutch element is adapted to be engaged to effect operation of the drag mechanism by imposing inward pressure on the handle axially thereof as by the palm of the hand of the operator.

A particular object is to provide a means for controlling the conventional drag mechanism of a fishing reel of the type above described, which is adapted to enable a fisherman to maintain the line leading from the reel taut while playing a hooked fish thereon, which is operable to compensate for variation in the strain or stress imposed on the line due to change of diameter of the line wound on the spool; also compensate for variation in the friction imposed on a clutch embodied in the drag mechanism; and also compensate for variation in the drag imposed on the line when advancing through water, and wherein the recited compensating actions may be accomplished instantly by the operator in actuating the drag control means.

A further object is to provide a construction in the drag mechanism control which is simple and economical in construction and efficient in operation.

With the foregoing objects in view together with such other objects and advantages as may subsequently appear, the invention resides in the parts and in the combination, construction and arrangement of parts hereinafter described and claimed, and as illustrated by way of example in the accompanying drawings in which:

Fig. 1 is an enlarged view in vertical section with parts shown in elevation of the spool winding crank, showing the drag mechanism associated therewith and also depicting a preferred form of the gripping handle control mechanism for adjusting the drag mechanism;

Fig. 2 is a view in section and elevation on a reduced scale taken on the line 2—2 of Fig. 1 as seen in the direction indicated by the arrows;

Fig. 3 is a view in section and elevation taken on the line 3—3 of Fig. 1 with parts removed;

Fig. 4 is a detail in section and elevation as seen on the line 4—4 of Fig. 1;

Fig. 5 is a view similar to Fig. 1 showing a modification of the drag mechanism control handle;

Fig. 6 is a view in section and elevation as seen on the line 6—6 of Fig. 5 in the direction indicated by the arrows;

Fig. 7 is a view in longitudinal section depicting another modified form of the drag mechanism control handle;

Fig. 8 is a cross section taken on the line 8—8 of Fig. 7 as seen in the direction indicated by the arrows; and Fig. 9 is an enlarged elevational view of one of several clutch elements appearing in Fig. 8.

Referring to the drawings more specifically wherein corresponding reference characters indicate corresponding parts throughout the several views, A indicates generally a fragmentary portion of the frame of a conventional fishing reel on which is journalled a shaft B whereon is fixed a line carrying spool C, all in a usual fashion. The shaft B has fixed thereon a spur gear D which meshes with a driving gear E loosely mounted on a tubular shaft F carrying the elements of a drag mechanism G for placing the gear E in and out of driving connection with the shaft F in a conventional manner. The drag mechanism comprises a plurality of spaced parallel disks 7 loose on the shaft F and having splined engagement with the gear E, together with friction rings 8 interposed between adjacent of the disks 7 and between an end disk 7 and a crowding ring 9 splined on the shaft F which shaft has opposed flat sides 10 with which the crowding ring 9 is slidably engaged. The shaft F encompasses and is revolubly mounted on a stud shaft 11 having a squared end fixed in a rectangular opening 12 in a bridge plate 12' carried by the frame A, the stud shaft 11 being held in place by a headed screw 13 engaging the squared end of the stud shaft 11 with the head thereof tightly abutting the bridge plate, all in a usual manner.

The inner end of shaft F is fitted with a ratchet wheel H engaged by a spring pawl I whereby rotation of the shaft F is limited to one direction. The outer end of the shaft F projects from the frame A and is formed with external screw threads 14. A spur gear 15 encompasses the shaft F and has screw engagement with the threads 14 for longitudinal movement relative to the shaft F. A crowding sleeve 16 encompasses the shaft F with one end thereof abutting the spur gear 15 and with its other end abutting a tensioned bowed spring 17 having end portions seating on the crowding ring 9 for exerting a yieldable thrust thereon.

Fixed on the outer end of the shaft F is a hollow crank J having spaced inner and outer side walls 22 and 26 respectively, the outer wall 26 having a rectangular opening c through which extends a squared outer end portion d on the tubular shaft F, the outer end of the shaft F projecting beyond the outer end of the stud shaft 11 and having an end wall e. A headed screw f engages the outer end of the shaft F with its head overlying and tightly abutting the outer wall 26 of the crank J thereby clamping such wall against a shoulder g at the base of the squared end d of the shaft F. The crank J houses the spur gear 15 and affords a mounting for a gear train K leading from the spur gear 15 and engaging a pinion gear 18 revolubly carried on a spindle 19 fixed on the outer end of the crank J and projecting laterally therefrom; the spindle 19 having a squared end 20 extending into a square opening 21 in the inner side wall 22 of the crank J and held in fixed engagement with the latter by a headed screw 23. The pinion 18 is affixed to a sleeve L turnably mounted on the spindle 19 which sleeve constitutes a mounting for a gripping handle M as will be later described.

In the construction shown in Fig. 1, the sleeve L has a flange 24 on its inner end to which the pinion 18 is affixed by screws 25, which flange slidably abuts the outer face of the outer side wall 26 of the crank J and overlies the margin of an opening 27 in the wall 26 into which a hub on the pinion 18 projects. The outer end portion of the sleeve L is reduced in diameter and has screwed thereon a nut 28. A headed screw 29 is engaged with the outer end of the spindle 19 and has its head overlying the outer end of the sleeve L and nut 28 in slightly spaced relation thereto, and serving to hold the sleeve L against longitudinal movement relative to the spindle 19 yet permit free rotation of the sleeve on the spindle.

Mounted on the sleeve L intermediate its ends is a clutch member N of the friction type embodying a disk 30 having a central opening 31 through which the outer end portion of the spindle 19 and sleeve L extend, the end portion of the sleeve L having opposed flat sides 32 engaged by flat marginal portions in the wall surrounding the opening 31 as shown in Fig. 3 whereby the clutch member N is held against rotation on the sleeve L. The clutch member N abuts a shoulder 33 on the sleeve L being tightly held against the shoulder by a bushing 34 encompassing the outer portion of the sleeve L and extending between the outer face of the disk 30 and a washer 35 held in place by the nut 28.

The outer face of the disk 30 has on its outer margin a series of axially extending elongated tapered resilient teeth 36 of the inner margins a of which extend parallel with the sleeve L in spaced relation thereto and the outer margins b of which incline inwardly toward the terminals of the teeth.

The gripping handle M is in the form of a knob having a cavity 37 in its rear side, and embodies an end wall 38 and a side wall 39 which latter borders the cavity 37, and also includes a central hub 40 projecting from the end wall 38 having an axial bore. The handle M is mounted with the hub 40 encompassing the bushing 34 in sliding contact therewith and with the side wall 39 surrounding the clutch teeth 36 on the disk 30 in close proximity thereto.

The end wall 38 has an axial cylindrical recess 41 opposite the inner end of the hub 40 within which is housed the washer 35, nut 28 and the head of the screw 29, the recess 41 being closed by a cap 42. The washer 35 abuts the bottom wall of the recess 41 and thus serves as a stop limiting outward movement of the handle relative to the sleeve L.

Encompassing the hub 40 is a thrust coil spring 43 which bears between the outer face of the disk 30 and the end wall 38 of the handle M, which spring acts to yieldably oppose inward movement of the handle relative to the sleeve L and to normally maintain the handle in its outermost position on the sleeve. The end of the hub 40 presented to the disk 30 is spaced from the latter to permit advance of the handle M relative to the disk 30 in opposition to the spring 43. The side wall 39 of the handle M has a beveled inner face 44 which overlies the clutch teeth 36 and constitutes a frustro-conical clutch member adapted to co-operate with the teeth 36 to effect frictional interengagement between the handle M and the disk 30; the face 44 being designed to be normally spaced from the outer inclined outer margins b of the clutch teeth 36 but in close proximity thereto when the handle M is disposed in its outermost position under the thrust of the spring 43, and is designed to be brought into frictional engagement with the teeth 36 on the handle M being pressed inwardly.

In order to effect a wedging action on the teeth 36 by advance of the beveled face 44 over the inclined margins b of the teeth, the angles of the face 44 and margins b relative to the horizontal differ slightly relative to each other, that of the face 44 being greater than that of the margins b, for example, the angle of the face 44 is 15° while the angle of the margins b is 14.05°. The angle of the face 44 being greater than that of the margins b initial advance of the handle will bring the face 44 into contact with only the outer end portions of the margins b thereby exerting inward thrusts on the outer end portions of the teeth 36 and whereby the tip of the teeth 36 may be forced inwardly. In order to utilize this movement of the teeth 36, the handle M has an internal annular shoulder 45 leading inwardly from the end wall 38 and extending in close proximity to the inner margins a of the teeth 36 whereby inward flexing of the teeth 36 will bring the inner margins a thereof into frictional engagement with the shoulder 45 thus amplifying frictional engagement between the handle M and the clutch teeth 36 which engagement is further augmented by continued advance of the handle to increase the area of contact between margins b of the teeth 36 and the beveled face 44 of the handle, the maximum of which is reached when the margins b and a of the teeth 36 are in full surface contact under pressure with the face 44 and shoulder 45 respectively.

As a means for facilitating inward advance of the handle M longitudinally of the sleeve L by pressure of the palm of the hand on the outer wall of the handle, a finger grip P is provided which comprises a cylindrical tubular shank 46 which snugly encompasses the inner end portion of the sleeve L, and a flared finger engaging flange 47 which abuts and extends over the back face of the disk 30 and is affixed to the latter to turn therewith as by means of a screw 48.

By the above recited construction, the handle M is normally free to rotate relative to the sleeve L over the bushing 34 so that when grasped in the hand without imposing inward pressure on its outer end, the handle may be utilized in rotating the crank arm J without effecting operation of the drag mechanism G; and during which operation the sleeve L and spindle 19 will rotate freely in unison relative to the handle M.

When it is desired to actuate the drag mechanism G by the above described control mechanism, the operator, while grasping the handle M with the palm of the hand imposed on the end wall 38 and with the fingers of such hand imposed on the flange 47 of the finger grip P, exerts an inward pressure on the outer end of the handle with a squeezing action such as to advance the handle longitudinally of the sleeve L over bushing 34 and thereby bring the beveled face 44 of the handle into frictional gripping engagement with the teeth 36 and if need be bring the under sides of the outer end portions of the teeth 36 into frictional gripping engagement with the shoulder 45, either or both of which gripping actions may be effected substantially instantaneously. On such gripping engagement being effected and a turning movement imparted to the handle M relative to the sleeve L; the disk 30 will be caused to turn with the handle M so as to effect turning of the sleeve L around the spindle 19 and thus turn the pinion 18 which is fixed on the sleeve L and thereby drive the gear train K so as to effect turning of the spur gear 15; the handle M being initially turned in such direction as to cause the gear 15 to advance on the threads 14 and thereby advance the sleeve 16 inwardly along the shaft F. This movement of the sleeve 16 actuates the drag mechanism G to place the disk 7 and rings 8 thereof in frictional engagement with each other so as to either retard turning of the gear E or hold it against rotation according to the desire of the operator and determined by the extent of pressure imposed on the drag mechanism which in turn is governed by the extent of the clutch operating pressure applied to the handle M. The movement of the gear E thus controlled is that effected by a pull on the line carried by the spool C acting to rotate the spool C, shaft B, and gears D and E.

Release or freeing of the drag mechanism is effected by reversing the direction of turning movement of the handle M so as to cause the gear 15 to advance outwardly on the shaft F. This operation of the drag mechanism may be accomplished either while rotating the crank J or while holding it stationary and irrespective of the position of the crank which is under control of the operator at all times while gripping the handle M.

The spool C freely rotates in the direction in which it turns to unwind the line therefrom, when casting and when a hooked fish is allowed to run; but by actuation of the drag mechanism G as above described, such rotation of the spool may be restrained to any desired extent or inhibited when desired as when operating the reel to pull in a catch.

As in the case of reels of the type set forth, the spool C may be rotated to wind a line thereon by operating the crank J when the drag mechanism is engaged, since the crank J is fixed on the shaft F. Rotation of the crank J will rotate the shaft F to drive the gear E through the then engaged drag mechanism thus driving the gear D, shaft B and spool C. During this operation the spool may be rendered free wheeling or partly so by disengaging or partly releasing the drag mechanism by turning the handle M backward.

It will now be seen that very slight turning of the handle M when pressed inwardly will place the drag mechanism in and out of engagement or allow for various conditions of drag from minimum to maximum.

In the construction shown in Figs. 5 and 6 the parts leading from the spool C through the gear train K to the sleeve R on the crank J correspond to those in the structure depicted in Figs. 1, 2 and 4, and accordingly the description thereof applies here and need not be repeated. The modification of the invention here shown resides in equipping the handle M with a positive clutch Q instead of a friction clutch as shown in Figs. 1 and 3. To accomplish this, the pinion 18 at the outer end of the crank J is fixed on a sleeve R turnably mounted on the spindle 19, and retained thereon by a nut 48 screwed on the outer end of the spindle.

The outer end portion of the sleeve R has screw threads 49 on which is screwed a clutch disk 50 tightly abutted against a shoulder 51 on the sleeve R at the base of the threads 49. A lock nut 52 is screwed on the threads 49 into abutting engagement with the disk 50. A combined spacing sleeve and bushing 53 loosely encompass the threaded end portion of the sleeve R the inner end of which abuts the nut 52 and the outer end of which is abutted by a nut 54 screwed on the threads 49, and which nut projects beyond the outer perimeter of the bushing 53 and projects in front of the outer end wall of the handle M thus affording a stop limiting outward movement of the handle M under the thrust of the spring 61. A clearance space is afforded between the outer face of the nut 54 and the inner face of the nut 48 on the spindle 19, to permit free rotation of the sleeve and handle assembly on the spindle, the nut serving to retain such assembly on the spindle.

The clutch disk Q has an annular row of clutch teeth 55 on its outer face and extending along the margin thereof for cooperation with a similar row of teeth on the handle M as will be later described.

Turnably mounted on the inner portion of the sleeve R is a finger grip S embodying a cylindrical shank 56 and an end flange 57 arranged with the shank abutting the hub of the pinion 18 and with the flange 57 slightly spaced from the clutch disk 50. The handle M revolubly encompasses the spacing sleeve 53 and has a recess 58 in its inner side bordered by an annular wall 59 which overlies the margins of the clutch disk 50 and flange 57 of the finger grip S, in spaced relation thereto.

The bottom wall of the recess 58 has an annular row of clutch teeth 60 lying opposite the annular row of teeth 55 and normally spaced from the latter by a thrust coil spring 61 bearing between the clutch disk 50 and the handle M within the recess 58. The handle M is equipped with a cap 62 which overlies the outer end of the spindle 19 and the nuts 48 and 54.

The operation of the above described modified construction is similar to that of the form of the device shown in Figs. 1 to 4 inclusive, except that in this instance operative connection between the handle M and the drag mechanism is effected on pressing the handle M inwardly to bring the teeth 60 thereon into engagement with the teeth 55 on the disk 50. On this being done, rotation of the handle M will operate through the clutch disk 50 to turn the sleeve R and thereby turn the pinion gear 18 to actuate the drag mechanism G through the gear train K in the manner before recited.

In the form of the invention shown in Figs. 7, 8 and 9, a spindle 19 is fixed on the outer end portion of a crank J by a screw 23 and has a pinion gear 18 revolubly mounted thereon within the crank J meshing with the outermost gear of a gear train K for actuating a drag mechanism not shown here, but embodied in the forms of the invention previously described. In this instance a sleeve T is revolubly mounted on the spindle 19 and fixedly engaged at its inner end to the pinion gear 18 by screws 25, the sleeve T having an end flange 24 disposed proximate the front side wall 26 of the crank J in turnable relation thereto. The sleeve T extends to near the outer end of the spindle 19 and is held against longitudinal movement on the spindle 19 by a headed screw 63 on the outer end of the spindle, the head of which screw overlies the outer end of the sleeve in slightly spaced relation thereto. The sleeve T has opposed flat sides 64 and has external screw threads 65 on its outer end portion.

Mounted on the sleeve T intermediate the ends thereof is a clutch disk U having a central opening 66 through which the flat sided outer portion of the sleeve T extends, said opening conforming to the sleeve whereby the flat sides 64 of the sleeve afford a driving connection between the disk and sleeve. The sleeve T has a shoulder 67 intermediate its ends against which the inner side of the disk U abuts. Loosely surrounding the sleeve T and extending between the flange 24 and the inner side of the disk U is a finger-hold V embodying a cylindrical tubular shank 68 having a flange 69 on its outer end the outer face of which is slightly spaced from the inner face of the disk U. The inner end of the shank 68 extends into an annular channel 70 in the outer face of the flange 24 and terminates in spaced relation to the bottom of the channel to permit inward movement of the finger-hold V on the sleeve T.

Extending between the disk U and the threaded outer end of the sleeve T and encompassing the sleeve T is a combined crowding sleeve and bushing 71 the inner end of which abuts the disk U and the outer end of which is abutted by a nut 72 screwed on the threads 65. A locknut 73 engaging the threads 65 bear against the nut 72. The bushing 71 and nut 72—73 serve to hold the disk U tightly against the shoulder 67.

Mounted on the bushing 71 for longitudinal and revoluble movement thereon is a handle W having a recess 74 in its inner side encompassed by an annular side wall 75 which overlies the outer margins of the disk U and the flange 69 of the finger-hold V; the side wall 75 being slightly spaced from the outer margin of the disk to afford a clearance gap 76 and being tightly wedged into engagement with the margin of the flange 69 so that the handle W and the finger-hold V may rotate in unison as a unit. The handle W has a front wall 77 having a central recess 78 to accommodate the outer end portions of the spindle 19 and sleeve T, which recess is closed by a cap 79. The nut 72 overlies the bottom of the recess 78 and forms an abutment limiting outward movement of the handle W on the bushing 71.

A thrust coil spring 80 bears between the outer side of the disk U and the inner face of the front wall 77 of the handle W to normally dispose the handle in its outermost position on the bushing 71 where it abuts the nut 72.

In carrying out the invention as shown in the construction now under consideration, the clutch disk U is formed with a margial cylindrical flange 81 leading from an annular flat forward end face 82, and the handle W is provided with an annular flange 83 projecting from the wall 77 into the recess 74 around the spring 80 and terminating adjacent the end face 82 in inwardly spaced relation thereto. Mounted on the end face 82 is a series of pairs of pivoted right and left eccentric clutch elements X operable to effect clutching inter-engagement of the flanges 81 and 83 but which elements are normally neutral. As here shown, particularly in Fig. 9, each of the clutch elements comprises a clamping pawl 84 turnably carried on a pivot pin 85 screwed into the disk U and projecting from the end face 82, the pawl 84 embodying opposed eccentric portions $h$—$i$ having peripheral faces $j$—$k$ respectively of which the face $j$ of the portion $h$ is presented to the outer peripherial face $m$ of the flange 83 while the face $k$ is presented to the inner peripherial face $n$ of the flange 81. The faces $j$—$k$ of the opposed eccentric portions $h$—$i$ terminate at their ends in shoulders $p$ one of which constitutes an abutment for one end of a tensioned thrust wire spring 86 carried on a pin 87 the other end of which bears on the outer margin of a lug 88 on the end face 82, said spring acting to normally exert a circumferential thrust on the clamping pawl 84 yieldably opposing turning of the pawl in one direction and tending to advance it in the other direction, the thrust of the spring 86 being against the wider end portion of the eccentric portion $h$ to exert a thrust on the pawl toward the reduced end of the portion $h$ whereby the eccentric peripherial faces $j$—$k$ will be caused, when the pawl is in operation, to effect wedge engagement with the flanges 83 and 81 respectively.

However, the pawls 84 are normally out of frictional contact with the outer face $m$ of the flange 83, that is, when the handle W is disposed in its outermost position under thrust of the spring 80, but are designed to be placed in frictional engagement with the face $m$ on advancing the handle W inwardly in opposition to the spring 80. In order to accomplish such action the outer face $m$ of the flange 83 is inclined as are the adjacent faces of the pawls 84 so that on inwardly advancing the handle W, the inclined face $m$ will be brought into contact with the pawls 84 and will exert a thrust thereon. On then turning the handle W in a direction wherein the face $m$ will engage the peripherial faces $j$ of the pawls 84 at the wider ends of the pawl portions $h$ with the face $m$ moving toward the reduced ends of the pawl portions $h$, wedge engagement of the pawls by the tapered face $m$ of the flange 83 will be effected and augmentd by the thrust of the spring 86 on the pawls. Obviously, reverse turning movement of the handle W, wherein the face $m$ moves toward the wider portion of the pawl portion $h$ from the narrower portions thereof, will break the wedge engagement between the flange 83 and the pawls 84.

On the pawls 84 being wedge engaged with the flange 83 and caused to turn with turning movement of the handle W as above stated, the outer peripherial faces $k$ of the pawls will be moved into abutting engagement with the inner face $n$ of the flange 81 to limit turning movement of the pawls. Inter-engagement of the handle W and disk U through the pawls 84 will then be effected so that turning the handle W will drive the disk U.

As a means for effecting such inter-engagement on turning the handle W in either direction, the pawls 84 of each pair thereof are reversed in relation to each other so that on turning the handle in one direction, when in its innermost position, one of the pawls of each pair will be actuated into its engaged position while the other pawls of each pair will be in their release position, the action of the pawls being reversed on turning the handle W in the opposite direction.

The operation of the form of the invention just described is as follows: The handle W when in its normal outward position under the urge of the spring 80 is free to rotate around the spindle 19, sleeve T, bushing 71 and clutch disk U, and so that these parts may turn within the handle as when holding it against rotation while turning the crank J. When it is desired to actuate a drag mechanism in the manner recited in connection with the form of the invention shown in Figs. 1 to 6 inclusive, the handle W is pressed inwardly between the palm of the hand seated on the outer end of the handle and the fingers of such hand gripping the finger-hold V, the handle W then moving toward the clutch disk U into frictional engagement with the clutch elements X on the disk and will actuate the clutch elements as above stated to inter-connect the handle W and disk U. Turning of the handle W will then rotate the disk U and sleeve T in unison therewith, thereby rotating the pinion gear 18 and actuating and controlling the drag mechanism as before described.

Rotating the handle W in one direction places the drag mechanism in operation while turning the handle in the opposite direction places the drag mechanism out of operation.

As is well known among reel fishermen, when playing or reeling in a hooked fish it is desirable to maintain the line leading from the reel taut and free of excess strain. The purpose of a drag mechanism in a reel is to enable the operator, by controlling the drag mechanism, to compensate for variations in the strain or stress imposed on the line in playing or reeling in a hooked fish. Variation in such strain is occasioned by any one or more of several factors, each of which are sensed by the operator, and include change of diameter of the line wound on the spool wherein if the diameter of winding is small a given pull on the line will be transmitted to the crank handle through the drag mechanism with less strain than where the winding is of large diameter, because of the difference in the leverage due to the variation of distance between the outer winding of the line and the axis of the reel. Another of such factors is the variation of friction of a clutch in the drag mechanism. Still another of such factors is occasioned by variation of the drag on the line due to variation of length of line submerged in water. On detecting such excess strain, the operator by actuating the drag control mechanism to release or partly release the clutch G permits desired unwinding of the line from the reel thereby relieving the strain on the line.

While I have shown and described specific embodiments of the invention, it is not confined to the exact details of construction set forth, but embraces such changes and modifications of the parts and arrangement thereof as come within the purview of the accompanying claims.

I claim:

1. In a fishing reel embodying a frame, a shaft, journalled in said frame, a spool fixed on said shaft, a crank carried by said frame, a gear drive between said crank and shaft, a drag mechanism interposed in said gear drive for placing said gear drive in and out of operative relation to said shaft and crank, a turnable handle on said crank, and means connected to said handle adapted to control said drag mechanism; the improvement comprising a mounting on which said handle is movable toward and away from said crank, spring means normally disposing said handle in its outermost position, and a clutch in said handle embodied in said drag mechanism controlling means normally disengaged by said spring means adapted to be engaged by inward movement of said handle relative to said crank.

2. In a fishing reel embodying a frame, a shaft journalled in said frame, a spool fixed on said shaft, a crank carried by said frame, a gear drive between said crank and shaft, a drag mechanism interposed in said gear drive for placing said gear drive in and out of operative relation to said shaft and crank, a turnable handle on said crank, and means connected to said handle adapted to control said drag mechanism; a spindle fixed on said crank, a sleeve revoluble on said spindle embodied in said last named means, said handle being mounted on said sleeve to turn freely thereon, and a normally disengaged clutch in said handle operable by manipulation of said handle to fixedly engage said handle and sleeve.

3. In a fishing reel embodying a frame, a shaft journalled in said frame, a spool fixed on said shaft, a crank carried by said frame, a gear drive between said crank and shaft, a drag mechanism interposed in said gear drive for placing said gear drive in and out of operative relation to said shaft and crank, a turnable handle on said crank, and means connected to said handle adapted to control said drag mechanism; a spindle fixed on said crank, a sleeve revoluble on said spindle embodied in said last named means, said handle being mounted on said sleeve to turn freely thereon and to move inwardly and outwardly thereon, a spring normally disposing said handle in its outermost position, a clutch in said handle having a member fixed on said sleeve normally disengaged from said handle, and means for inter-engaging said clutch and handle on moving said handle inwardly in opposition to said spring.

4. In a fishing reel embodying a frame, a shaft journalled in said frame, a spool fixed on said shaft, a crank carried by said frame, a gear drive between said crank and shaft, a drag mechanism interposed in said gear drive for placing said gear drive in an out of operative relation to said shaft and crank, a turnable handle on said crank, and means connected to said handle adapted to control said drag mechanism; a spindle fixed on said crank, a sleeve revoluble on said spindle embodied in said last named means, said handle being mounted on said sleeve to turn freely thereon and to move inwardly and outwardly thereon, a spring normally disposing said handle in its outermost position, a clutch disk fixed on said sleeve, and cooperative clutch elements on said disk and handle normally disengaged when said handle is in its outermost position and interengageable on inward movement of said handle.

5. In a fishing reel embodying a frame, a shaft journalled on said frame, a spool fixed on said shaft, a crank carried by said frame, a gear drive between said crank and shaft, a drag mechanism interposed in said gear drive for placing said gear drive in and out of operative relation to said shaft and crank, a spindle fixed on the outer end portion of said crank, a pinion gear revoluble on said spindle, and a gear drive carried on said crank connecting said pinion gear to said first named gear drive; a sleeve revoluble on said spindle fixed at its inner end to said pinion gear, a handle revolubly mounted on the outer end portion of said sleeve and movable inwardly and outwardly thereon, means on said sleeve limiting outward movement of said handle, a spring normally disposing said handle in its outermost position, a clutch disk fixed on said sleeve intermediate its ends, a finger hold turnably encompassing said sleeve having an end flange overlying the inner side of said clutch disk, and clutch elements on said disk and handle normally disengaged when said handle is in its outermost position and adapted to be interengaged on inward movement of said handle.

6. The structure called for in claim 4 wherein said clutch element comprise elongated teeth projecting from the outer face of said disk having inwardly inclined outer margins, and a side wall on said handle having an inclined inner face overlying the inclined margins of said teeth adapted to be frictionally engaged with the latter on inward movement of said handle.

7. The structure called for in claim 4 wherein said clutch element comprise elongated teeth projecting from the outer face of said disk having inwardly inclined outer margins, and a side wall on said handle having an inclined inner face overlying the inclined margins of said teeth adapted to be frictionally engaged with the latter on inward movement of said handle, said handle having an annular flange extending inwardly of said teeth, and said teeth being flexible for inward movement into frictional engagement with said flange.

8. The structure called for in claim 4 in which said clutch elements comprise a series of teeth on the outer face of said disk and teeth on said handle opposite and normally disengaged from said series of teeth and adapted to be engaged therewith on inward movement of said handle.

9. The structure called for in claim 4 in which said clutch elements comprise a series of pawls pivoted on said disk having eccentric peripherial faces and an annular flange on said handle having an outer periphery normally spaced from said pawls and adapted on inward movement of said handle to have gripping engagement with said pawls.

10. The structure called for in claim 4 in which said clutch elements comprise a series of pawls pivoted on said disk having eccentric peripherial faces and an annular flange on said handle having an outer periphery normally spaced from said pawls, said flange having an inclined outer periphery operable on inward movement of said handle to have gripping engagement with said pawls.

11. The structure called for in claim 4 in which said clutch elements comprise a plurality of pairs of pawls pivoted on said disk, and an annular flange on said handle having an inclined outer periphery normally disengaged from said pawls operable on inward movement of said handle to have gripping engagement with said pawls; the pawls each having eccentric portions having peripheries presented to said annular flange with the eccentric portion of one pawl of each pair of pawls extending opposite the eccentric portion of the other pawl of each pair thereof.

12. The structure called for in claim 4 together with an annular flange on said handle, a marginal flange on said disk surrounding the flange on said handle in spaced relation thereto, a plurality of pawls pivoted on said disk between said flanges, each of said pawls having opposed enlarged eccentric end portions with peripherial faces presented to said flanges, and springs on said disk yieldably thrusting the enlarged end portions of said pawls toward said flanges.

13. In a fishing reel embodying a crank, a spindle having inner and outer ends fixed at its inner end on the outer end portion of said crank, a pinion gear revolubly mounted on the inner end portion of said spindle, a drag mechanism, gear connections between said pinion gear and said drag mechanism; a sleeve revolubly mounted on said spindle having opposed flat faces on its outer end portion and an externally threaded outer end and having an inner end, means connecting the inner end of said sleeve to said pinion, abutment means on the outer end of said spindle limiting outward movement of said sleeve on said spindle, a clutch disk mounted on said spindle intermediate its ends engaged and held against rotation relative to said sleeve by said flat faces, a bushing encompassing the outer end portion of said sleeve having an inner end abutting said clutch disk, a handle revolubly mounted on said bushing and movable longitudinally thereon, abutment means screwed on the outer end of said sleeve against said bushing limiting outward movement of said handle on said sleeve, a finger-hold having a cylindrical shank portion revolubly encompassing the inner end portion of said sleeve having an outer end flange abutting said clutch disk, a spring interposed between said clutch disk and said handle normally thrusting said handle to its outermost position on said sleeve, and co-operative clutch members on said disk and handle disengaged when said handle is in its outermost position on said sleeve and inter-engageable when said handle is in its innermost position on said sleeve.

14 In a fishing reel the combination of a crank, a revoluble sleeve mounted on the outer end portion of said crank, a drag mechanism, a gear drive on said crank connecting said sleeve and drag mechanism and adapted to actuate the latter, a handle revolubly and longitudinally movable on said sleeve, a spring yieldably thrusting said handle to a normal outermost position, and clutch mechanism in said handle for making and breaking driving connection between said handle and sleeve, said clutch mechanism being open when said handle is in its normal outermost position and being closed when the handle is moved inwardly.

References Cited in the file of this patent

UNITED STATES PATENTS

| | | |
|---|---|---|
| 2,252,777 | Marr | Aug. 19, 1941 |
| 2,363,533 | King | Nov. 28, 1944 |
| 2,518,902 | King | Aug. 15, 1950 |
| 2,569,006 | King | Sept. 25, 1951 |
| 2,638,762 | Rayner | May 19, 1953 |
| 2,713,274 | Lockwood | July 19, 1955 |